April 24, 1928.

O. G. WENDEL 1,667,020

PRESSURE RESPONSIVE DEVICE

Filed Sept. 21, 1921

Inventor
OTTO G. WENDEL

Attorney

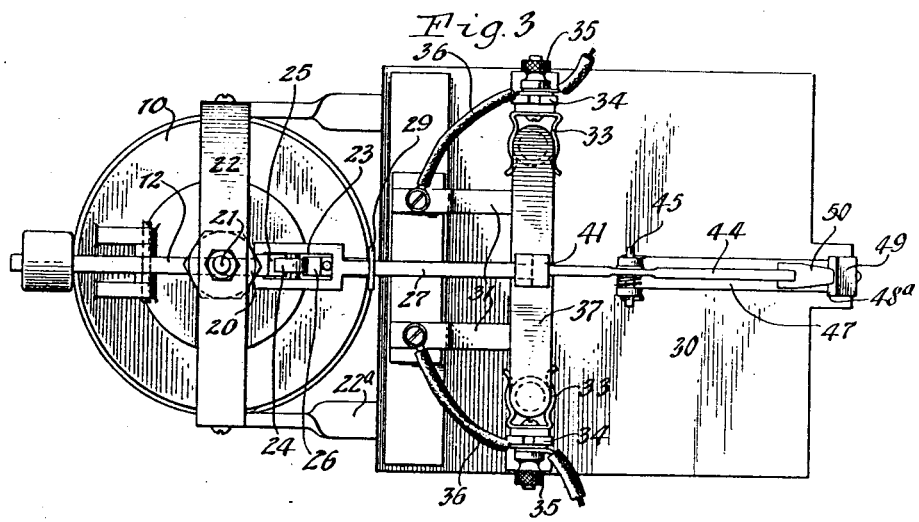
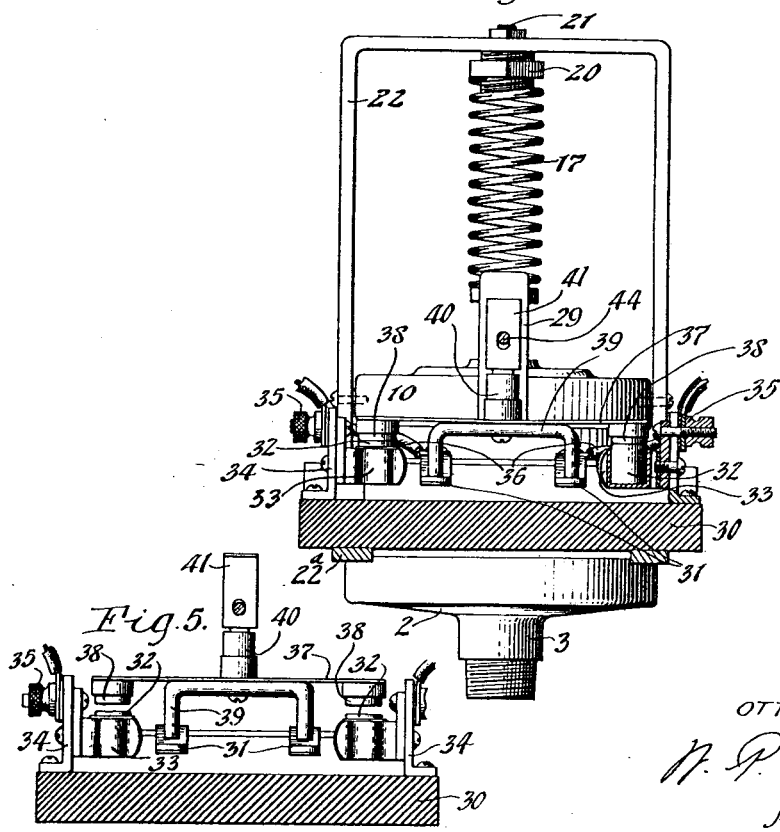

Patented Apr. 24, 1928.

1,667,020

UNITED STATES PATENT OFFICE.

OTTO G. WENDEL, OF BUFFALO, NEW YORK, ASSIGNOR TO AMERICAN RADIATOR COMPANY, OF CHICAGO, ILLINOIS, A CORPORATION OF NEW JERSEY.

PRESSURE-RESPONSIVE DEVICE.

Application filed September 21, 1921. Serial No. 502,237.

My invention relates to improvements in pressure responsive devices, and is particularly applicable to the operation of electric switches, and the same has for its object more particularly to provide a simple, efficient and reliable device especially adapted for controlling the circuit of electrically heated boilers to maintain a given pressure or temperature of the heating medium therein in order to render such boilers available for testing radiators, or other heat emitting apparatus.

Further, said invention has for its object to provide a circuit controlling device which is quickly responsive to variations in conditions obtaining within a boiler or other heating apparatus.

Further, said invention has for its object to provide a device in which a movable member shall operate with a sudden or snap action in its movement.

Further, said invention has for its object to provide a circuit controlling device in which the circuit controlling member thereof is actuated by hammer blows imparted thereto.

Further, said invention has for its object to provide a circuit controlling device in which a hammer blow is imparted to a circuit controlling member to actuate the same by means of an arm having a snap movement.

Further, said invention has for its object to provide a snap actuated device in which, upon operation of the device, the thrust of a spring finger is so directed as to impart a snap movement to the device in either direction.

Further, said invention has for its object to provide a circuit controlling device tending to move into operative position, and held in inoperative position and which is actuated by hammer blows applied by a snap action.

Other objects will in part be obvious and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawings forming part of this specification—

Fig. 3 is a plan view thereof;

Fig. 4 is an end elevation thereof, looking towards the circuit controlling member, parts being omitted and parts being in section, the parts shown being in circuit closing position, and Fig. 5 is a detail end elevation of the circuit controlling member illustrated in Fig. 4, said member being shown in open circuit position.

Figure 1:
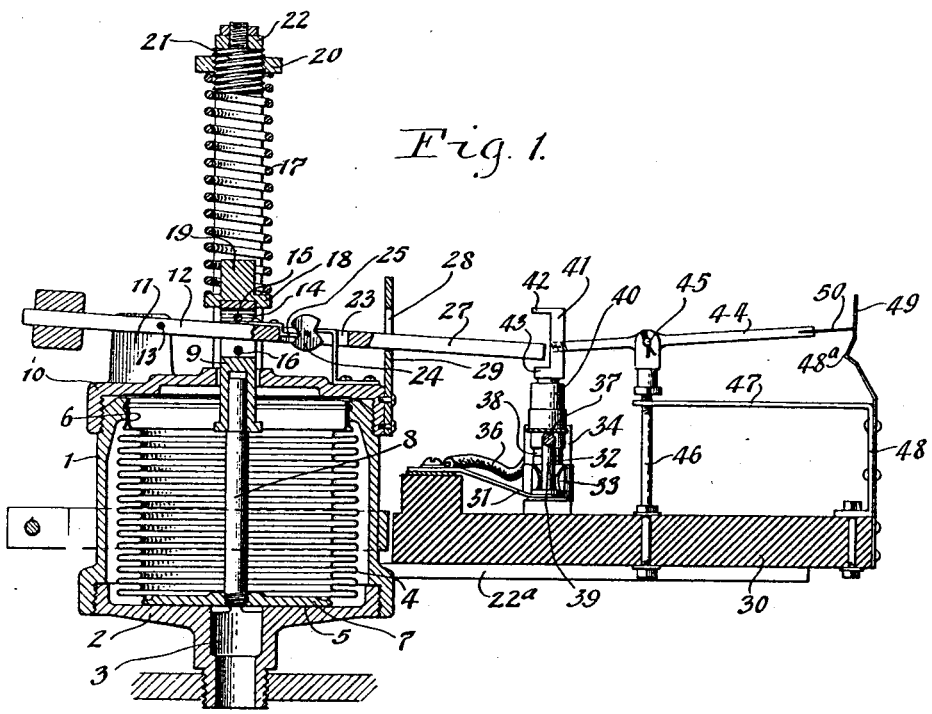
Figure 1 is a longitudinal sectional elevation showing one form of circuit controlling device constructed according to and embodying my said invention; the parts being shown in circuit closing position.

In the embodiment illustrated I provide a pressure responsive device comprising a cylindrical enclosing casing 1 having its bottom closed by a head 2 screw-threaded into the casing and provided with a hollow stem 3 screw-threaded at its outer end to engage in the pressure tank or other apparatus. Arranged within this casing 1 is an expansible-collapsible member 4 preferably comprising a tubular wall corrugated and having its lower end closed by an integral head 5. The upper end of the tubular wall is secured by brazing, soldering or otherwise to the inner wall 6 of the casing, a fluid tight joint being made at this point. The corrugated wall and the cylinder 1 thus form a pressure chamber and due to the flexibility of the corrugations of the wall the tubular member 4 will expand and collapse under variations of pressure admitted to the cylinder. Secured within the expansible-collapsible member 4 is a rigid disc 7 receiving the lower end of a stem 8, the upper end of which makes a slip joint with a stem extension 9 projecting outwardly centrally through a cover 10 closing the upper end of casing 1. Pivoted between ears 11 on cover 10 at one side of extension 9 is a rocker arm or lever 12. The arm 12 is pivoted on a horizontal axis 13 between its ends and has a part extending horizontally over the cover 10 through a slot 14 in the extension 9. The lever or arm 12 is counterbalanced by means of a weight mounted upon the arm or lever 12 at the opposite side of pivot 13. Pins 15 and 16 are secured to member 9 transversely of slot 14 and upon opposite sides of lever 12, being sufficiently spaced to permit movement of arm 12 between them, and arranged to move or operate arm 12 in opposite directions as the member 9 responds to variations in pressure. The stem of the expansible-collapsible member operates against a coiled spring 17 one end of which bears upon a shoulder 18 on a projection 19 of the extension 9 and the other end bears against a nut 20 on the threaded stem 21 secured in the top of a yoke 22. This yoke, as will be noted, is rigidly secured in position to the casing 1 by means of suitable screws and has a pair of horizontally disposed arms 22ª, the purpose of which will be more fully hereinafter disclosed. The arm 12 has a slot or bifurcation 23 therein at a point on the side of member 9 remote from pivot 13. Within slot 23 is adapted to operate means for actuating the arm 12 to impart a snap movement thereto. This means comprises an arm actuating member 24 having formed therein upon opposite sides V-shaped notches. The member 24 is interposed within slot 23 between a spring finger 25 secured to arm 12 and arranged within the slot 23 and a spring 26 secured to the support or cover 10, extending into slot 23 and having a finger engaging the opposite side of member 24, said fingers constituting bearings centered in the notches on member 24. The spring 26 exerts a pressure against member 24 in a direction longitudinally of lever 12 and transversely of the direction of movement of said lever, and the fingers or bearings 25 and 26 are arranged to be in alignment with each other and with pivot 23 when arm 12 is substantially horizontal. As the arm 12 is operated to move in either direction out of a horizontal position, the member 24 is tilted to direct the thrust of the spring 26 to impart a snap action up and down to arm 12. This arm 12 is provided with an extension 27 passing through a slot 28 in a limiting member 29 secured to the top 10, and the outer end of the extension 27 is arranged to actuate a circuit controlling member.

Figure 2:
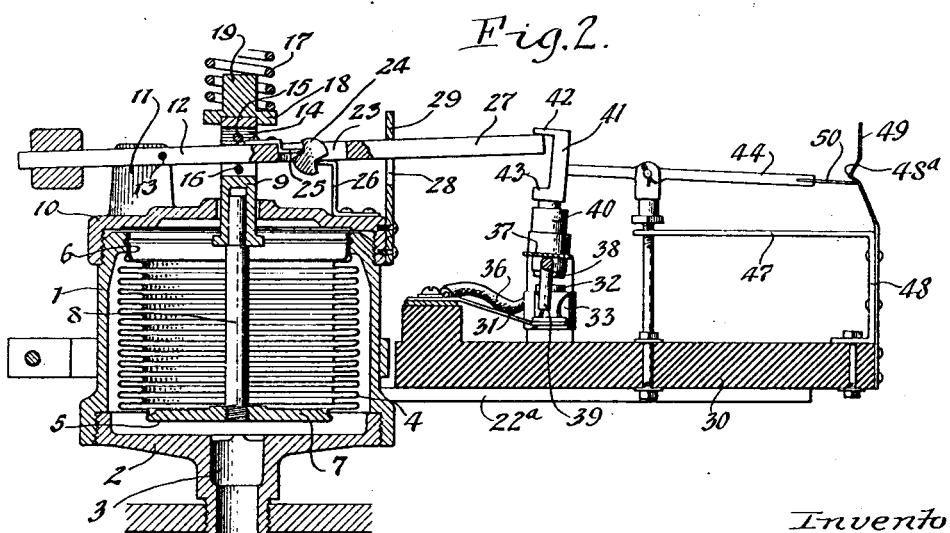
Fig. 2 is a longitudinal sectional elevation, as in Figure 1, with the parts in open circuit position.

The circuit controlling means is mounted upon a suitable insulating base 30 secured in position upon the two arms 22ª and comprises a pair of stationary metallic spring contacts 31 and a pair of stationary carbon contacts 32. These carbon contacts are mounted in spring clips 33 adjustably secured in vertically extending arms 34 which arms also carry the binding posts 35 for the electric conductors, conductors 36 extending from the binding posts 35 to the spring contacts 31. The movable member comprises a cross spring arm 37 carrying at its outer ends carbon contacts 38 and a bridging contact member 39, arranged to engage the spring contact fingers 31. These two members are secured upon a vertically extending stem 40 of insulating material which is provided at the upper end with an operating member 41 having a pair of spaced apart lugs or anvils 42 and 43 between which extension 27 operates. This stem is secured to one end of a rocking lever 44 pivoted at 45 to post 46 secured to base 30 and braced by a member 47 having a portion 48 secured to base 30, lever 44 being vertically adjustable on post 46. The lever 44 and circuit controlling member secured thereto tend to drop by gravity into circuit closing position when released from a catch or detent 48ª formed as an angular part of a spring finger 49 arranged vertically on base 30 and engaging a spring finger 50 on the adjacent end of lever 44, such detent holding the circuit controlling means in inoperative condition as illustrated in Fig. 2.

The operations of the device is substantially as follows: Assuming the parts to be as illustrated in Fig. 1, upon increase of pressure in casing 1 sufficient to overcome spring 17, the extension 9 will start to lift arm 12 moving the bearings 25 and 26 into alignment, as the arm reaches a horizontal position, thereupon as the movement continues, member 24 will tilt into the position shown in Fig. 2 causing spring 26 to impart a snap movement to extension 27 which strikes the lug 42 with a hammer blow, raising the circuit controlling member and opening the circuit, the detent 48ª holding the member in inoperative condition. The upward movement of extension 27 is limited by member 29. When the pressure in casing 1 decreases the spring 17 will move extension 9 in the opposite direction lowering the arm 12 until the member 24 is actuated in the reverse direction causing the spring 26 to impart a snap movement to extension 27 downwardly which strikes the lug 43 a hammer blow, disengaging detent 48ª and closing the circuit, the spring fingers 31 and spring 37 taking up the shock of the impact and insuring proper engagement of the contacts. The downward movement of extension 27 is limited by member 29, permitting independent movement of arm 44 downwardly into circuit closing position after detent 48ª is released therefrom. By adjusting nut 20 the tension of spring 17 can be accurately adjusted to cause the device to operate at different desired pressures. There is sufficient lost motion between the arm 12 and pins 15 and 16 to permit the snapping movement of the arm relatively thereto.

The spring 37 permits the yoke 39 to continue its downward movement after the carbon contacts engage and the contacts 32 are adjustable so they can be located to insure that the yoke 39 will disengage contacts 31 before contacts 32 are disengaged, thereby preventing sparking or arcing at contacts 31 upon movement of the circuit controlling member to inoperative position. Any arcing which takes place will be at the contacts 32—38 which are of carbon and hence not easily injured, the latter thus protecting contacts 31.

While I have illustrated and described one embodiment of my invention, it will be understood that various modifications and changes may be made therein without departing from the spirit of the invention as set forth in the appended claims.

Having thus described my invention, what I claim as new and desire to secure by Letters Patent is:

1. A device of the character described comprising a support, a plunger adapted to be reciprocated relative to said support, a rocker arm pivoted to said support at one side of said plunger and extending transversely of said plunger between opposing portions of the same to permit of said plunger positively moving said arm back and forth; said opposing portions being spaced to permit of a limited independent movement of said arm between said opposing portions, and a snap action device interposed between said arm and said support for imparting a snap movement to said arm in one direction or the other depending on the direction of movement of said plunger, substantially as specified.

2. A device of the character described comprising a support, a plunger movable relative to said support, a balanced rocker arm pivoted on said support at one side of said plunger, extending transversely across said plunger and having a lost motion connection therewith, whereby said arm may be moved by said plunger relatively to said support and moved independently thereof, and means interposed between said support and said arm for imparting a snap movement thereto in one direction or the other depending on the direction of movement of said plunger, substantially as specified.

3. A device of the character described comprising a support, a rocker arm having a slot therein pivoted to said support, a spring secured to said support and extending into said slot to provide a bearing at one end of said spring, an opposing bearing on said arm within said slot, a member disposed within said slot between said bearings and having notches receiving said bearings, and means for operating said arm, substantially as specified.

4. A device of the character described comprising a support, a plunger adapted to be reciprocated relatively to said support, a balanced rocker arm pivoted at one side of said plunger, extending transversely thereof and having a lost motion connection therewith whereby said arm may be moved back and forth by said plunger while permitting movement thereof relatively to said plunger, cooperating bearings secured to said arm and said support; one of said bearings including a spring, and an arm actuating member interposed between said bearings and arranged to cause said spring to impart a snap movement to said arm as said bearings relatively move out of alignment upon operation of said arm by said plunger, substantially as specified.

5. A device of the character described comprising a support, a reciprocating member mounted on said support for movement in opposite directions, a rocker arm pivoted to said support at one side of said member, and extending transversely of and having a lost motion connection with said member, whereby said arm may be moved in opposite directions thereby and independently thereof, and means interposed between said support and said arm for imparting a snap movement to said arm relatively to said reciprocating member when the former is moved by the latter, substantially as specified.

6. A device of the character described comprising a support, a pressure operated plunger movable relatively to said support, an adjustable spring for controlling the movement of said plunger under pressure variations, a balanced rocker arm pivoted on said support at one side of said plunger, extending transversely across said plunger and having a lost motion connection therewith, whereby said arm may be moved relatively to said support by said plunger while permitting independent movement thereof, said arm having a slot therein at a point at the opposite side of said plunger, a spring secured to said support and having a finger extending within said slot and constituting a bearing, a cooperating bearing secured to said arm and extending into said slot, and an arm actuating member interposed between said bearings within said slot, having notches upon opposite sides thereof receiving said bearings, taking the thrust of said spring and arranged to be tilted in opposite directions to direct the thrust of said spring to impart a snap movement to said arm in one direction or the opposite, depending on the direction of movement of said plunger, substantially as specified.

7. A device of the character described comprising a pivoted circuit controlling member mounted for movement in opposite directions and having a weighted arm tending to drop by gravity into circuit closing position, a spring detent for holding said member in elevated position, and means for imparting hammer blows to said member in opposite directions, whereby to release said member and cause the same to drop into circuit closing position and to return said member into engagement with said detent to be retained in elevated position, substantially as specified.

8. A device of the character described comprising a pivoted circuit controlling member having a weighted arm tending to drop by gravity into one position, a detent for holding said member in the opposite position, a pivoted rocker arm arranged to impart a hammer blow to said member to release the same from said detent and cause the same to drop, and means for actuating said rocker arm with a snap movement, substantially as specified.

9. A device of the character described comprising an arm pivoted between its ends, a circuit controlling member secured to said arm at one end, a spring finger at the opposite end of said arm, a spring detent pressing against said finger and having an angular part adapted to maintain said member in one position, and means for imparting hammer blows to said member in opposite directions to release said finger from said angular part, moving said member in one direction and to move said member into locking engagement with said angular part, substantially as specified.

10. A device of the character described comprising a lever pivoted intermediate its ends on a horizontal axis, a circuit controlling member secured at one end of said lever and tending to drop by gravity into circuit closing position, a spring detent engaging the opposite end of said lever to maintain said member in raised position, spaced anvils having opposing horizontal surfaces secured to said member, a pivoted rocker arm having an end extending between said anvils and movable vertically to strike either one or the other of said anvils, means for operating said arm in opposite directions, and means for imparting a snap movement thereto in each direction to cause the same to strike one anvil or the other with a hammer blow, substantially as specified.

11. A device of the character described comprising a support, a horizontally extending lever thereon pivoted between its ends on a horizontal axis, cooperating circuit controlling members mounted on one end of said lever and on said support respectively, a spring for taking up the shock of the engagement of said members with each other when said lever drops, a spring finger secured to the opposite end of said lever, a spring detent engaged by said finger for maintaining said members in inoperative position, and snap actuated means for imparting a hammer blow to said member mounted on said lever to move the same into or out of operative position, substantially as specified.

12. A device of the character described comprising a pivoted circuit controlling member adapted to drop into operative position, a detent for retaining the same in inoperative position, spaced anvils on said member, a pivoted rocking arm having a portion extending between said anvils, means for imparting snap movements in opposite directions to said arm to cause the same to strike said anvils to actuate said member in opposite directions to release the same from and cause the same to engage said detent, and means at opposite sides of said arm adapted to engage the same for limiting the movement of said arm in each direction, said member being free to drop into operative position after said arm engages said limiting means, substantially as specified.

13. A device of the character described comprising a casing, a pressure and spring operated plunger reciprocating in said casing, a balanced rocker arm pivoted on said casing at one side of said plunger, extending transversely thereof over the casing and having a lost motion connection therewith, a spring connection between said casing and said arm at points at the opposite side of said plunger and including means operable, when said arm is operated by said plunger, to cause said spring to impart a snap movement to said arm in opposite directions, means for limiting the movement of said arm, a circuit controlling member pivoted at one side of said casing and movable into and out of operative position, a spring detent for holding said member inoperative, and anvil means arranged in the path of said arm, whereby said member is given hammer blows to move the same in opposite directions as said arm is snapped in opposite directions, substantially as specified.

In witness whereof, I have hereunto subscribed my name.

OTTO G. WENDEL.